United States Patent
Kang et al.

(10) Patent No.: US 12,510,214 B2
(45) Date of Patent: Dec. 30, 2025

(54) LIGHTING APPARATUS AND METHOD FOR MANUFACTURING SAME

(71) Applicant: LG ELECTRONICS INC., Seoul (KR)

(72) Inventors: Bokyung Kang, Seoul (KR); Gunyoung Hong, Seoul (KR); Younggil Yoo, Seoul (KR); Minsung Kim, Seoul (KR); Kyungpil Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 452 days.

(21) Appl. No.: 17/792,824

(22) PCT Filed: Jan. 14, 2020

(86) PCT No.: PCT/KR2020/000642
§ 371 (c)(1),
(2) Date: Jul. 14, 2022

(87) PCT Pub. No.: WO2021/145470
PCT Pub. Date: Jul. 22, 2021

(65) Prior Publication Data
US 2023/0043329 A1 Feb. 9, 2023

(51) Int. Cl.
*F21K 9/64* (2016.01)
*C09K 11/59* (2006.01)
*F21Y 115/10* (2016.01)
*H10H 20/851* (2025.01)

(52) U.S. Cl.
CPC ............... *F21K 9/64* (2016.08); *C09K 11/59* (2013.01); *H10H 20/8513* (2025.01); *F21Y 2115/10* (2016.08)

(58) Field of Classification Search
CPC ..... F21K 9/64; F21V 3/12; F21V 9/30; F21V 9/38; F21V 9/40; F21Y 115/10
See application file for complete search history.

(56) References Cited

U.S. PATENT DOCUMENTS

| | | | |
|---|---|---|---|
| 2009/0194781 A1 | 8/2009 | Harada | |
| 2009/0261358 A1* | 10/2009 | Chitnis | H01L 33/508 257/E33.061 |
| 2010/0012964 A1* | 1/2010 | Copic | C04B 35/584 264/21 |
| 2014/0246692 A1* | 9/2014 | Cui | C09K 11/77347 252/301.4 F |

(Continued)

FOREIGN PATENT DOCUMENTS

| | | |
|---|---|---|
| DE | 10 2013 105 533 A1 | 12/2014 |
| EP | 2 246 409 A1 | 11/2010 |

(Continued)

*Primary Examiner* — William J Carter
(74) *Attorney, Agent, or Firm* — Birch, Stewart, Kolasch & Birch, LLP

(57) ABSTRACT

A lighting apparatus can include a light emitting element that can irradiate light, and an optical conversion layer disposed on the light emitting element for converting the irradiated light. The optical conversion layer can include crystal grains of a first phosphor and crystal grains of a second phosphor, and the crystal grains of the first phosphor and the crystal grains of the second phosphor can be in mixed form in the optical conversion layer.

15 Claims, 6 Drawing Sheets

(56) References Cited

U.S. PATENT DOCUMENTS

| | | |
|---|---|---|
| 2016/0009990 A1 | 1/2016 | Yoo et al. |
| 2016/0348857 A1* | 12/2016 | Miyata ................. F21S 41/176 |
| 2017/0160627 A1 | 6/2017 | Ikesue et al. |
| 2018/0277720 A1 | 9/2018 | Zheng et al. |

FOREIGN PATENT DOCUMENTS

| | | |
|---|---|---|
| JP | 5491867 B2 | 5/2014 |
| JP | 2019-66880 A | 4/2019 |
| KR | 10-1297619 B1 | 8/2013 |
| KR | 10-2016-0008443 A | 1/2016 |
| KR | 10-2018-0023386 A | 3/2018 |

* cited by examiner

LIGHTING APPARATUS AND METHOD FOR MANUFACTURING SAME

CROSS REFERENCE TO RELATED APPLICATIONS

This application is the National Stage filing under 35 U.S.C. 371 of International Application No. PCT/KR2020/000642, filed on Jan. 14, 2020, which is hereby expressly incorporated by reference into the present application.

BACKGROUND

1. Technical Field

The present disclosure relates to a lighting apparatus and a method for manufacturing same.

More particularly, the present disclosure relates to a lighting apparatus including an optical conversion layer in which crystal grains of a first phosphor and crystal grains of a second phosphor are mixed.

2. Description of the Related Art

When light irradiated from a light emitting diode including an LED passes through a phosphor included in the optical conversion layer, a wavelength of the light is adjusted to be emitted to the outside.

In this case, in order to variously convert the light irradiated from the light emitting diode, an optical conversion layer may include various phosphors to variously convert the light wavelength.

However, the optical conversion layer used in the conventional lighting apparatus has a multi-layered structure in which layers are formed for each type of phosphor, and thus, the shape of the optical conversion layer is complicated.

In addition, when the optical conversion layer includes a resin, there is a problem in that optical efficiency is deteriorated due to deterioration due to high output at high temperature.

SUMMARY

The technical problem to be solved by the present disclosure will be described as follows.

First, the present disclosure is to provide a lighting apparatus and a method for manufacturing the same including an optical conversion layer having a simple structure.

Second, the present disclosure is to provide a lighting apparatus and a method for manufacturing the same including an optical conversion layer that does not include a resin.

In addition, the present disclosure is to solve all problems that can be generated or predicted from the prior art in addition to the technical problems described above.

According to an aspect of the present disclosure, there is provided a light apparatus including an optical conversion layer in which crystal grains of a first phosphor and crystal grains of a second phosphor are mixed.

Specifically, the lighting apparatus includes a light emitting element configured to irradiate light and an optical conversion layer disposed on the light emitting element and configured to convert the irradiated light.

The optical conversion layer includes the crystal grains of the first phosphor and the crystal grains of the second phosphor, and the crystal grains of the first phosphor and the crystal grains of the second phosphor are mixed in the optical conversion layer.

The light emitting element may include a blue LED.

The optical conversion layer may be a ceramic optical conversion layer.

The first phosphor may be $SrSi_2O_2N_2$ and the second phosphor may be $Sr_2Si_5N_8$.

A weight % of the first phosphor compared to the optical conversion layer and a weight % of the second phosphor compared to the optical conversion layer may be different from each other.

The weight % of the first phosphor compared to the optical conversion layer may be less than the weight % of the second phosphor compared to the optical conversion layer.

A thickness of the optical conversion layer may be uniform

A thickness of the optical conversion layer may be non-uniform.

A thickness of the optical conversion layer may decrease from a center portion toward an edge.

Unevenness may be formed on a surface of a surface of the optical conversion layer facing the light emitting element.

In a method for manufacturing a light apparatus according to one embodiment of the present disclosure, a first phosphor and a second phosphor are ball-milled.

Powder of the first phosphor and powder of the second phosphor are arranged in a mold to form a plate.

The plate is subjected to heat treatment to form an optical conversion layer.

The forming of the plate may include arranging and compressing the powder of the first phosphor and the powder of the second phosphor in the mold.

The heat treatment may include forming the powder of the first phosphor to crystal grains of the first phosphor and forming the powder of the second phosphor to crystal grains of the second phosphor.

The method may further include positioning the optical conversion layer on the light emitting element.

The method may further include forming unevenness or a surface gradient by polishing one surface of the optical conversion layer after the optical conversion layer.

Effects of the Disclosure

According to the light apparatus and the method for manufacturing the same of the present disclosure described above, the following effects are obtained.

In the light apparatus and the method for manufacturing the same of the present disclosure, the optical conversion layer in which the crystal grains of the first phosphor and the crystal grains of the second phosphor are mixed is provided, and thus, it is possible to improve durability by implementing a simple structure that converts light without separately stacking the first phosphor and the second phosphor.

In the light apparatus and the method for manufacturing the same of the present disclosure, the ceramic optical conversion layer without including a resin is provided, and thus, thermal stability can be excellent even at high temperature and high output.

In the light apparatus and the method for manufacturing the same of the present disclosure, the optical conversion layer includes $SrSi_2O_2N_2$ and $Sr_2Si_5N_8$, and thus, excellent color rendering and stable light conversion performance can be realized.

BRIEF DESCRIPTION OF THE DRAWINGS

The embodiments will be described in detail with reference to the following drawings in which like reference numerals refer to like elements wherein.

DETAILED DESCRIPTION

Figure 1:
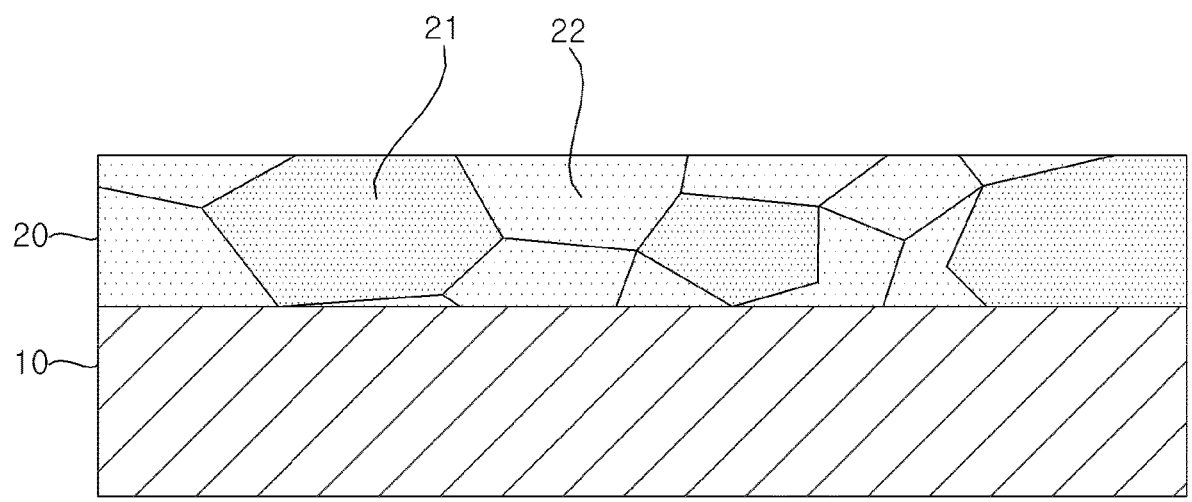
FIG. 1 is a cross-sectional view of a lighting apparatus according to one embodiment of the present disclosure.

Advantages and features of the present disclosure and methods for achieving them will become apparent with reference to the following embodiments.

The present disclosure is defined by the scope of the claims, and if there is a separate description for the meaning of a term in the specification, the meaning of the term will be defined by the above description. Like reference numerals refer to like elements throughout.

A lighting apparatus 100 of the present disclosure includes a light emitting element 10 for irradiating light, and a light changing layer 20" for converting a wavelength of the light irradiated from the light emitting element.

The optical conversion layer 20 includes crystal grains of the first phosphor 21 and crystal grains of the second phosphor 22 that are mixed.

In this regard, the lighting apparatus 100 according to one embodiment of the present disclosure will be described with reference to FIG. 1.

First, the light emitting element 10 will be described. The light emitting element 10 may directly generate and irradiate light from the lighting apparatus 100.

The light emitting element 10 may include an LED as a light source, for example, a blue LED.

LEDs consume less power than conventional light sources, and unlike fluorescent lamps, LEDs do not contain mercury, and thus, LEDS can be eco-friendly. Furthermore, compared to the conventional light source, a lifespan is long and a response speed is fast.

However, in the lighting apparatus 100 according to one embodiment of the present disclosure, the light emitting element 10 is not limited to the above description, and it will be said that a configuration that a person skilled in the art can easily use as a light source is included.

The lighting apparatus 100 may be used together with a phosphor that absorbs the light irradiated from the light emitting element 10 and converts the wavelength of the light, and then emits light of various colors.

Specifically, an optical conversion layer 20 for converting the light irradiated from the light emitting element 10 may be provided on the light emitting element 10.

In the present specification, it should be understood that the optical conversion layer 20 being disposed on the light emitting element 10 has not only a configuration in which the optical conversion layer 20 is positioned while directly in contact with a front surface of the light emitting element 10 but also a configuration in which the optical conversion layer 20 is separated from the light emitting element 10 and an intermediate member is positioned between the emitting device 10 and the optical conversion layer 20.

Furthermore, the optical conversion layer 20 includes a first phosphor 21 and a second phosphor 22, and the first phosphor 21 and the second phosphor 22 are mixed in the optical conversion layer 20.

The first phosphor 21 and the second phosphor 22 may absorb the light irradiated from the light emitting element 10, convert the physical properties such as wavelength and intensity, and emit the converted light.

For example, the first phosphor 21 and the second phosphor 22 may absorb blue light irradiated from the light emitting element 10, change the wavelength thereof, and then convert a color of the light to another color and emit the converted light.

In the optical conversion layer 20 according to one embodiment of the present disclosure, the first phosphor 21 and the second phosphor 22 are not dispersedly arranged in the form of powder. That is, the first phosphor 21 and the second phosphor 22 are in the form of crystal grains, respectively, and in the optical conversion layer 20, the crystal grains of the first phosphor 21 and the crystal grins of the second phosphor 22 may be arranged to be mixed.

For example, the optical conversion layer 20 may be a single layer, and in this case, the crystal grains of the first phosphor 21 and the crystal grains of the second phosphor 22 may be arranged to be mixed in the single layer.

In the present disclosure, crystal grains (grain) have a concept opposite to fine powder particles, and refers to a state in which the first phosphor 21 and the second phosphor 22 are adjacent to each other and crystallized with the same type of powder.

In addition, crystal grains refer to a portion surrounded by an azimuth boundary, where the "azimuth boundary" means a boundary at which a contrast is discontinuously changed when tissues are observed according to a scanning transmission electron microscope (STEM).

That is, the optical conversion layer 20 according to one embodiment of the present disclosure does not form the optical conversion layer for each of the first phosphor 21 and the second phosphor 22, the optical conversion layer 22 in which the first phosphor 21 and the second phosphor 22 are mixed is formed, and thus, formability and durability can be improved with a simple structure.

In addition, the optical conversion layer 20 according to one embodiment of the present disclosure may be a ceramic optical conversion layer 20 including crystal grains of the first phosphor 21 and the crystal grains of the second phosphor 22 mixed so as not to include a resin or the like.

Therefore, even when high-temperature heat due to long-term and high-output is transferred to the optical conversion layer 20, the possibility of deterioration or discoloration is significantly reduced, thermal stability is improved, and excellent optical efficiency can be maintained.

In the present disclosure, the fact that the optical conversion layer 20 does not include the resin or the like means that the optical conversion layer 20 does not include a resin as a base matrix in which the first phosphor 21 and the second phosphor 22 powder particles are accommodated and dispersed.

Therefore, it does not mean that the optical conversion layer 20 does not contain a polymer material in a strict sense, but it will include even a case where there is a polymer that may be included in a trace amount in the manufacturing process at the level of a person skilled in the art.

However, it will be said that the structure of the optical conversion layer 20 is not limited to the structure shown in the above description and drawings, and includes a structure that can be easily designed and changed by a person of ordinary skill in the art.

For example, the optical conversion layer 20 may be formed of a plurality of layers.

The thickness of the optical conversion layer 20 according to one embodiment of the present disclosure may be uniform or a surface of the optical conversion layer 20 may be flat.

However, the shape of the optical conversion layer 20 is not limited to the above description or drawings, and may be controlled in various shapes.

Figure 2A:
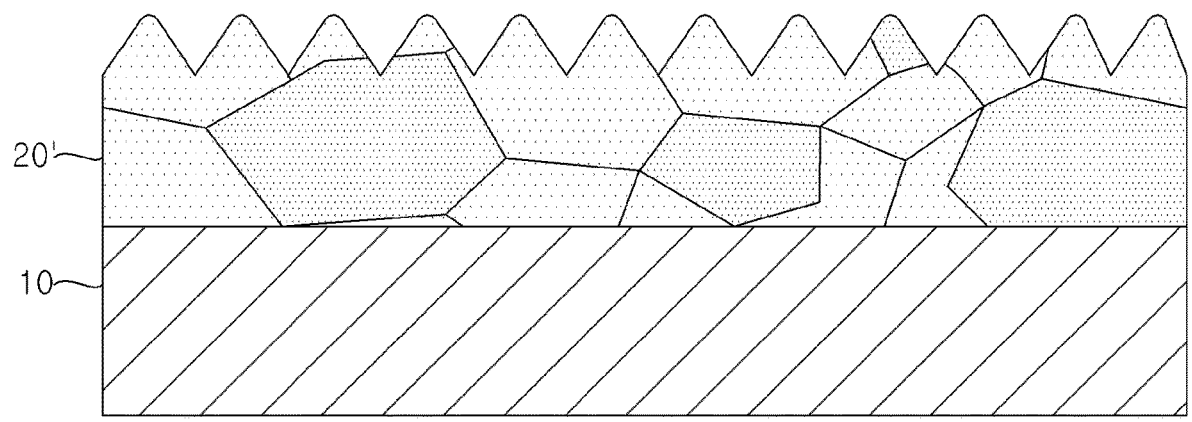
FIGS. 2A and 2B are cross-sectional views of a lighting apparatus according to another embodiment of the present disclosure.

Referring to FIG. 2A, unevenness may be formed on one surface of the optical conversion layer 20' according to another embodiment of the present disclosure.

For example, unevenness 21a may be formed on a front surface of the optical conversion layer 20' facing the light emitting element 10, and a direction of light irradiated to a bottom surface due to the unevenness 21a formed on the front surface may be adjusted Specifically, when the pyramid-shaped unevenness is formed, a light extraction effect and straightness may be improved by reducing the light irradiation angle.

However, the shape and location of unevenness is not limited to the content described in the description or drawings, and it will be said that it includes a range that can be easily designed and changed by a person skilled in the art.

For example, the shape of unevenness may have a quadrangular prism or an irregular shape, and unevenness may be formed on both the front surface and the back surface, or only a part of the front surface.

Figure 2B:
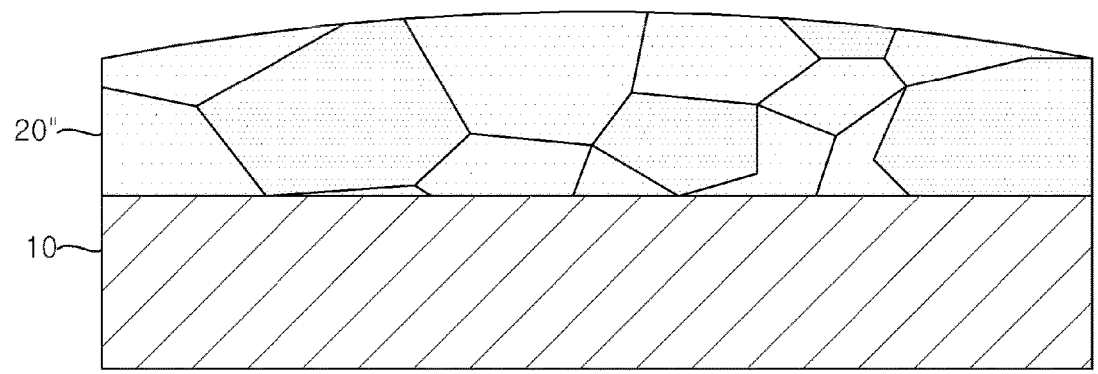

In addition, referring to FIG. 2B, an optical conversion layer 20" according to still another embodiment of the present disclosure may have a non-uniform thickness, and for example, a thickness of the optical conversion layer 20" may decrease from a center portion thereof toward an edge.

In this case, an irradiation angle of the light irradiated through the optical conversion layer 20" increases, and thus, the light can be irradiated over a large area, and the light extraction efficiency can be increased.

However, a thickness gradient of the optical conversion layer 20" is not limited to the structure described in the above description or drawings. For example, the thickness may increase from the center portion toward the center portion.

Moreover, in the optical conversion layer 20 of the lighting apparatus 100 included in one embodiment of the present disclosure, the first phosphor 21 may be $SrSi_2O_2N_2$, and the second phosphor 22 may be $Sr_2Si_5N_8$.

That is, in the lighting apparatus 100 of the present disclosure, since each of the first phosphor 21 and the second phosphor 22 includes a specific material, excellent color rendering and stable light conversion performance can be realized.

Specifically, in the optical conversion layer 20 according to one exemplary embodiment of the present disclosure, the first phosphor 21 including $SrSi_2O_2N_2$ and the second phosphor 22 including $Sr_2Si_5N_8$ do not react with each other in a process of forming the crystal grains of the first phosphor 21 and the crystal grains of the second phosphor 22, and thus, secondary phase formation or phase separation of phosphor can be prevented.

Figure 3:
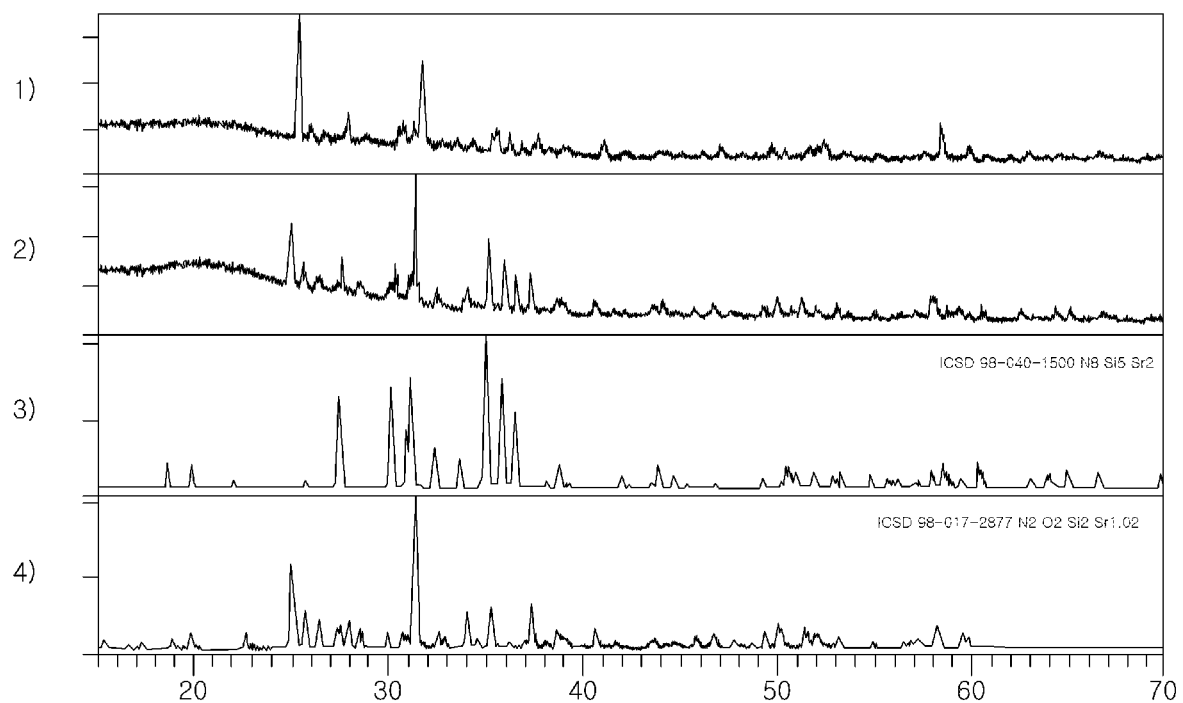
FIG. 3 is an XRD result of an optical conversion layer of a lighting apparatus according to one embodiment of the present disclosure.

FIG. 3 is an XRD graph of first and second phosphors 21 and 22 before and after sintering.

Specifically, a graph 3) is XRD Ref,data of Sr258 on ICSD, and a graph 4) is XRD Ref,data of Sr1222 on ICSD.

In addition, a graph 2) is an XRD graph of a mixed state of the first phosphor 21 and the second phosphor 22 before sintering, and a graph 1) is an XRD graph of a mixed state of the first phosphor 21 and the second phosphor 22 after sintering.

Referring back to FIG. 3, it can be seen that in a peak distribution of the graph 2) showing the state before sintering and the graph 1) showing the state after sintering, peaks of the graph 1) and the graph 2) coexist, and from this, the secondary phases are not formed or phase decomposition does not occur during the sintering process, and Sr1222 and Sr258 phases exist before and after sintering as they are.

Figure 4A:
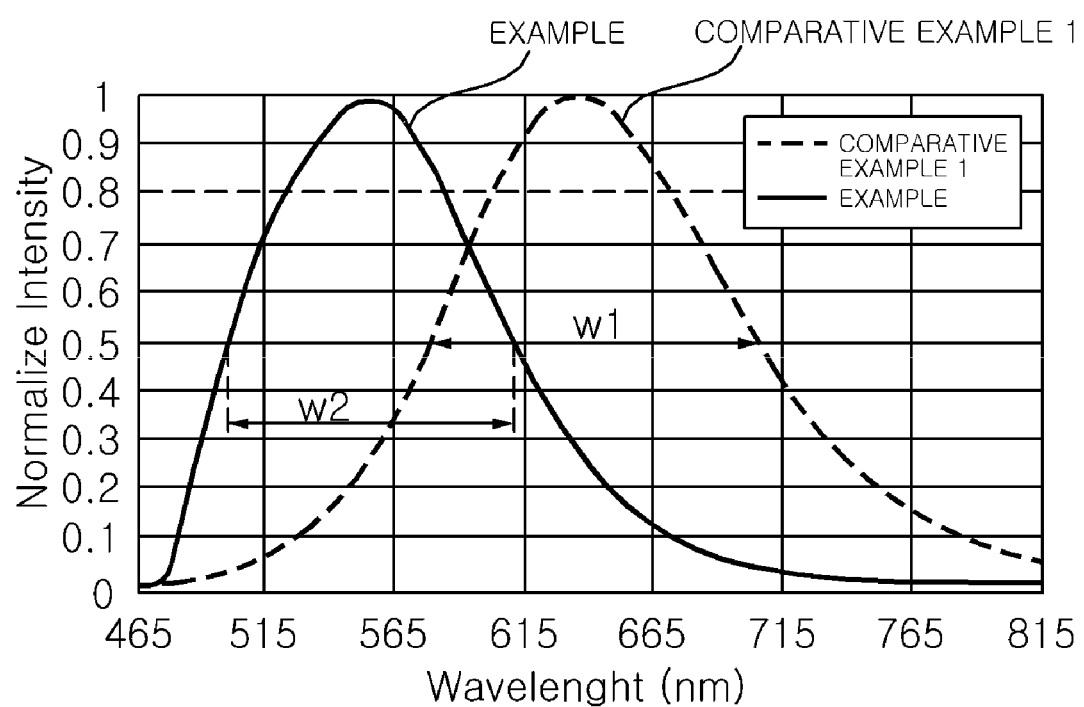
FIGS. 4A and 4B are emission spectrums of an optical conversion layer of a lighting apparatus according to Examples and Comparative Examples of the present disclosure.

Additionally, FIG. 4A shows a comparison between a normalized emission spectrum of the optical conversion layer 20 according to one embodiment of the present disclosure and an emission spectrum of an optical conversion layer according to Comparative Example 1.

The optical conversion layer according to Comparative Example 1 includes $Sr_2Si_5N_8$:Eu and $SrSi_2O_2N_2$:Eu as phosphors, and is sintered.

Referring back to FIG. 4A, in the optical conversion layer 20 according to one embodiment of the present disclosure, the secondary phase formation or phase decomposition between the first phosphor 21 and the second phosphor 22 does not occur, and thus, a yellow-based wavelength band and a red-based wavelength band exist simultaneously by each phosphor.

Meanwhile, the spectrum of the optical conversion layer according to Comparative Example 1 shows only the red light emission spectrum.

In the comparative example, it is confirmed that both yellow-based phosphor and red-based phosphor are included, but during the sintering process, a secondary phase was formed due to phase decomposition between phosphors, and thus, the first yellow-based phosphor properties disappear.

As a result, in the lighting apparatus 100 according to one embodiment of the present disclosure, the optical conversion layer 20 includes a specific material in each of the first phosphor 21 and the second phosphor 22, and thus, it is possible to increase the accuracy of light conversion by the designed phosphor and to prevent unintentional light conversion due to phosphor denaturation, and thus, it is possible to realize stable light conversion performance.

In addition, the optical conversion layer 20 according to one embodiment of the present disclosure includes the first phosphor 21 including $SrSi_2O_2N_2$ and the second phosphor 22 including $Sr_2Si_5N_8$, and thus, excellent color rendering can be realized.

Figure 4B:
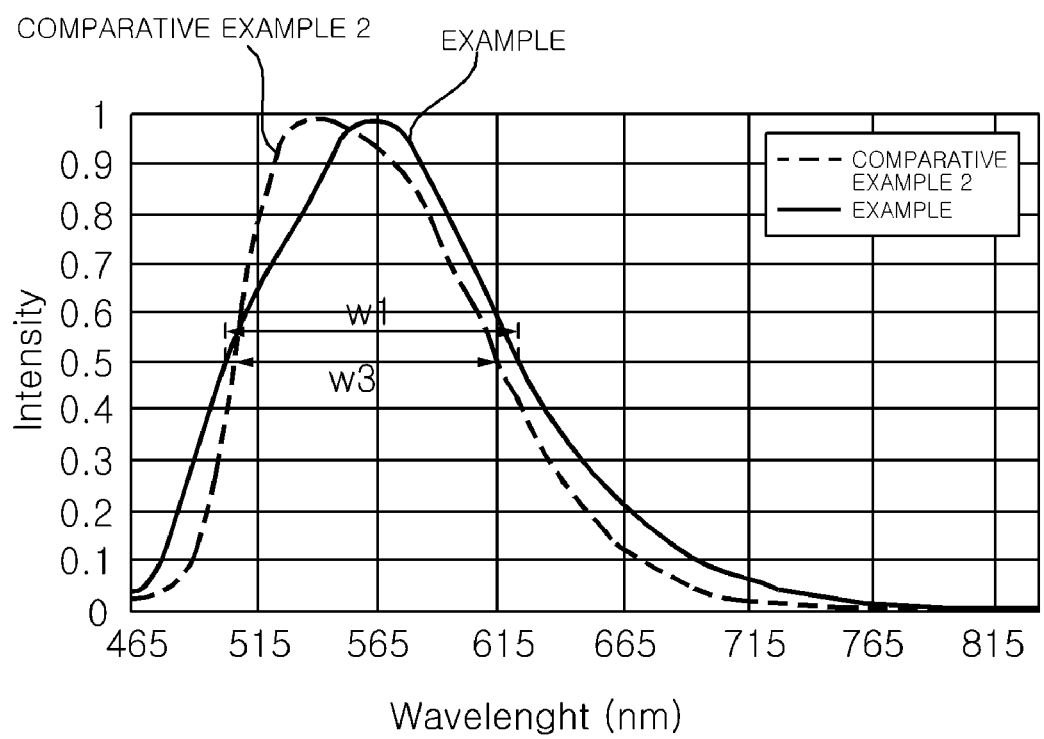

Specifically, referring to FIGS. 4A and 4B, the emission spectrum of the optical conversion layer 20 according to one embodiment of the present disclosure has a wide full-width at half maximum, and thus, excellent color rendering can be realized.

First, referring to FIG. 4A, it can be seen that a full-width at half maximum (W1) of the optical conversion layer 20 according to one embodiment of the present disclosure is relatively larger than a full-width at half maximum (W2) of Comparative Example 1 to realize excellent color rendering.

In addition, even with reference to FIG. 4B, excellent color rendering of the optical conversion layer 20 according to one embodiment of the present disclosure can be confirmed.

Comparative Example 2 is an emission spectrum of YAG sintered phosphor.

In FIG. 4B, the full-width at half maximum (W1) of the optical conversion layer 20 according to one embodiment of the present disclosure is relatively larger than a width at half maximum (W3) of Comparative Example 2 to implement excellent color rendering.

In the optical conversion layer 20 according to one embodiment of the present disclosure, by adjusting weight % of each of the first phosphor 21 and the second phosphor 22 included in the optical conversion layer 20, it is possible to diversify the emission spectrum of the optical conversion layer 20 and improve the color rendering.

For example, the weight % of the first phosphor 21 and the weight % of the second phosphor 22 relative to the optical conversion layer 20 may be different from each other.

Specifically, as the weight % of the red-based second phosphor 22 increases, the spectral intensity of the red-based wavelength region may increase and the full-width at half maximum may increase.

That is, in the optical conversion layer 20 according to one embodiment of the present disclosure, by setting the weight % of the second phosphor 22 to be relatively larger than the weight % of the first phosphor 21, it is possible to increase the intensity of the emission spectrum and widen the full-width at half maximum to improve the color rendering.

However, the conditions of the weight % of the first phosphor 21 and the weight % of the second phosphor 22 of the optical conversion layer 20 are not limited to the above description, and the weight % of the first phosphor 21 and the weight % the second phosphor 22 may be the same, or the weight % of the first phosphor 21 may be relatively larger than the weight % of the second phosphor 22.

Figure 5:
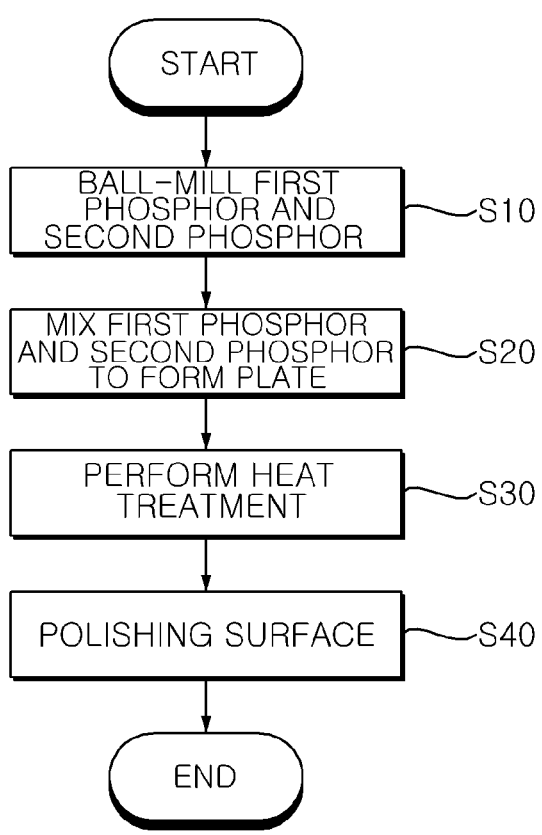
FIG. 5 is a flowchart of a method for manufacturing a lighting apparatus according to one embodiment of the present disclosure.

Next, a method for manufacturing the lighting apparatus 100 according to one embodiment of the present disclosure will be described with reference to FIG. 5.

In the lighting apparatus 100 according to one embodiment of the present disclosure, it is possible to form the crystal grains of the first phosphor 21 and the crystal grains of the second phosphor 22 by performing heat treatment on the first phosphor 21 and the second phosphor 22.

Specifically, in the method for manufacturing the lighting apparatus according to one embodiment of the present disclosure, the first phosphor 21 powder and the second phosphor 22 powder may be formed by using a ball milling process (S10).

In the ball milling process (S10), the first phosphor 21 and the second phosphor 22 in a bulk state may be cut to form powder of the first phosphor 21 and powder of the second phosphor 22.

A particle diameter of the powder of the first phosphor 21 and the second phosphor 22 formed through the ball milling (S10) may be about 5 □m to about 20 □m.

The particle diameter of the phosphor powder is a factor that affects sintering conditions and sintering density to be treated later, and thus, as the particle diameter increases, the sintering temperature may increase and the sintering density may decrease.

In the method for manufacturing a lighting apparatus according to one embodiment of the present disclosure, by limiting the powder particle diameters of the first phosphor 21 and the second phosphor 22 to the above ranges, it is possible to prevent the heat treatment temperature from becoming too high and increase the sintering density, while reducing the manufacturing cost and increasing the reliability of product properties.

However, in the method for manufacturing a lighting apparatus according to one embodiment of the present disclosure, the particle diameter of the powder of each of the first phosphor 21 and the second phosphor 22 is not limited to the above ranges, and may include a range that can be easily designed and changed by a person skilled in the art.

Subsequently, a plate (not shown) may be formed (S20) by using the powder of the first phosphor 21 and the powder of the second phosphor 22.

Specifically, the plate may be formed by preparing a plate-shaped mold, placing the powder of the first phosphor 21 and the powder of the second phosphor 22 powder on the mold and compressing the powder by applying pressure.

The plate has the same composition as that of the optical conversion layer 20. However, in the plate, the first and second phosphors 21 and 22 exist in a powder state, but in the optical conversion layer 20, the first and second phosphors 21 and 22 exist in a crystal grain state.

Subsequently, the plate thus formed may be subjected to a heat treatment process (S30).

Specifically, by performing heat treatment on the plate, the powder of the first phosphor 21 grows into the crystal grains of the first phosphor 21 and the powder of the second phosphor 22 grows into the crystal grains of the second phosphor 22.

More specifically, the secondary phase formation or phase decomposition by the reaction between the first phosphor 21 and the second phosphor 22 does not occur during the heat treatment process (S30).

Therefore, the adjacent powders of the first phosphor 21 and the adjacent powders of the second phosphor 22 react and grow to form the crystal grains of the first phosphor 21 and the crystal grains of the second phosphor 22, and thus, the optical conversion layer 20 is formed.

The optical conversion layer 20 thus formed may be subjected to surface polishing (S40) according to the purpose and purpose of the lighting apparatus 100.

For example, unevenness may be formed on the front surface of the optical conversion layer 20, or a surface gradient may be formed by cutting one side of the surface to form a thickness gradient.

However, the surface polishing (S40) is an additional process and may be omitted if necessary.

The optical conversion layer 20 thus formed is positioned on the light emitting element 10 to convert light irradiated from the light emitting element 10 into light.

As mentioned above, although the embodiments of the present disclosure have been illustrated and described, the present disclosure is not limited to the specific embodiments described above, and in the present disclosure, various modifications can be made by a person with ordinary knowledge in the technical field to which the invention belongs without departing from the gist of the present disclosure claimed in claims, and these modifications should not be individually understood from the technical spirit or perspective of the present disclosure.

What is claimed is:

1. A lighting apparatus comprising:
   a light emitting element configured to irradiate light; and
   an optical conversion layer disposed on the light emitting element and configured to convert the irradiated light,
   wherein the optical conversion layer includes crystal grains of a first phosphor and crystal grains of a second phosphor,
   wherein the crystal grains of the first phosphor and the crystal grains of the second phosphor are in mixed form in the optical conversion layer,
   wherein the first phosphor is $SrSi_2O_2N_2$ and the second phosphor is $Sr_2Si_5N_8$, and wherein a weight % of the first phosphor compared to the optical conversion layer is less than a weight % of the second phosphor compared to the optical conversion layer.

2. The lighting apparatus of claim 1, wherein the light emitting element includes a blue light emitting diode (LED).

3. The lighting apparatus of claim 1, wherein the optical conversion layer is a ceramic optical conversion layer.

4. The lighting apparatus of claim 1, wherein a thickness of the optical conversion layer is uniform.

5. The lighting apparatus of claim 1, wherein a thickness of the optical conversion layer is non-uniform.

6. The lighting apparatus of claim 1, wherein a thickness of the optical conversion layer decreases from a center portion toward an edge of the optical conversion layer.

7. The lighting apparatus of claim 1, wherein an unevenness is formed on a surface of the optical conversion layer facing the light emitting element, and
wherein the crystal grains of the first phosphor and the crystal grains of the second phosphor on the surface of the optical conversion layer respectively include the unevenness.

8. The lighting apparatus of claim 1, wherein the optical conversion layer excludes the resin as a base matrix in which the first phosphor and the second phosphor are accommodated and dispersed.

9. A method for manufacturing a lighting apparatus, the method comprising:
ball-milling a first phosphor and a second phosphor;
forming a plate by arranging a powder of the first phosphor and a powder of the second phosphor in a mold; and
forming an optical conversion layer by performing heat treatment on the plate,
wherein the first phosphor is $SrSi_2O_2N_2$ and the second phosphor is $Sr_2Si_5N_8$, and
wherein a weight % of the first phosphor compared to the optical conversion layer is less than a weight % of the second phosphor compared to the optical conversion layer.

10. The method of claim 9, wherein the forming of the plate includes arranging and compressing the powder of the first phosphor and the powder of the second phosphor in the mold.

11. The method of claim 9, wherein the heat treatment includes forming the powder of the first phosphor into crystal grains of the first phosphor and forming the powder of the second phosphor into crystal grains of the second phosphor.

12. The method of claim 9, further comprising positioning the optical conversion layer on a light emitting element.

13. The method of claim 9, further comprising forming unevenness or a surface gradient by polishing one surface of the optical conversion layer after forming of the optical conversion layer.

14. The method of claim 9, wherein the optical conversion layer excludes the resin as a base matrix in which the first phosphor and the second phosphor are accommodated and dispersed.

15. A lighting apparatus comprising:
a light emitting element configured to irradiate light; and
an optical conversion layer on the light emitting element and configured to convert the irradiated light of one wavelength to another wavelength,
wherein the optical conversion layer includes crystal grains of a first phosphor and crystal grains of a second phosphor that are dispersed and coplanar in the optical conversion layer,
wherein the first phosphor is $SrSi_2O_2N_2$ and the second phosphor is $Sr_2Si_5N_8$, and
wherein a weight % of the first phosphor compared to the optical conversion layer is less than a weight % of the second phosphor compared to the optical conversion layer.

* * * * *